US 8,336,500 B1

(12) United States Patent
Britt

(10) Patent No.: US 8,336,500 B1
(45) Date of Patent: Dec. 25, 2012

(54) PET CRATE DEVICE WITH SEPARATE CONTAINER FOR BATHROOM

(76) Inventor: Jeremy Britt, Arizona City, AZ (US)

( * ) Notice: Subject to any disclaimer, the term of this patent is extended or adjusted under 35 U.S.C. 154(b) by 87 days.

(21) Appl. No.: 12/948,961

(22) Filed: Nov. 18, 2010

(51) Int. Cl.
*A01K 1/00* (2006.01)
*A01K 31/07* (2006.01)

(52) U.S. Cl. .......................... 119/472; 119/497

(58) Field of Classification Search .............. 119/452, 119/453, 455, 482, 496–498, 501, 472–474, 119/479, 499
See application file for complete search history.

(56) References Cited

U.S. PATENT DOCUMENTS

| | | | | |
|---|---|---|---|---|
| 1,581,082 A | * | 4/1926 | Clarke | 119/487 |
| 2,079,458 A | * | 5/1937 | Leichtfuss | 220/7 |
| 2,892,562 A | * | 6/1959 | Smithson | 220/7 |
| 3,918,406 A | * | 11/1975 | Patterson | 119/473 |
| 4,016,833 A | | 4/1977 | Ray | |
| 4,763,606 A | | 8/1988 | Ondrasik, II | |
| D314,251 S | | 1/1991 | Van Skiver | |
| 5,233,939 A | * | 8/1993 | Randolph | 119/473 |
| 5,307,758 A | * | 5/1994 | Ho | 119/497 |
| 5,471,950 A | * | 12/1995 | White | 119/497 |
| 5,476,066 A | | 12/1995 | Hoffman | |
| 5,503,107 A | * | 4/1996 | Satcher et al. | 119/496 |
| 5,551,372 A | | 9/1996 | Nicholls | |
| 5,960,744 A | | 10/1999 | Rutman | |
| 6,196,975 B1 | * | 3/2001 | Labrecque et al. | 600/551 |
| 6,793,630 B2 | * | 9/2004 | Labrecque et al. | 600/551 |
| 6,971,333 B1 | | 12/2005 | Hearrell | |
| 8,132,537 B2 | * | 3/2012 | Trunnell et al. | 119/496 |
| 2009/0223461 A1 | * | 9/2009 | Trunnell et al. | 119/472 |
| 2010/0043720 A1 | * | 2/2010 | Yelverton | 119/496 |

* cited by examiner

*Primary Examiner* — Kristen C Hayes

(57) ABSTRACT

A pet crate device for providing a pet a place to rest and a place to use the bathroom. The device features a first container with a first access door is disposed in the front of the first container and a first back opening is disposed in the back, and a second container with a second back opening is disposed in the back. A first attachment means secures the backs of the two containers together. A track surrounding the first back opening, and a divider board can slide into and out of the track allowing and preventing access to the inner cavity of the first compartment. A tab extends upwardly from the top of the divider board. The tab functions as a handle. A divider board lock can secure the divider board in the closed position.

3 Claims, 6 Drawing Sheets

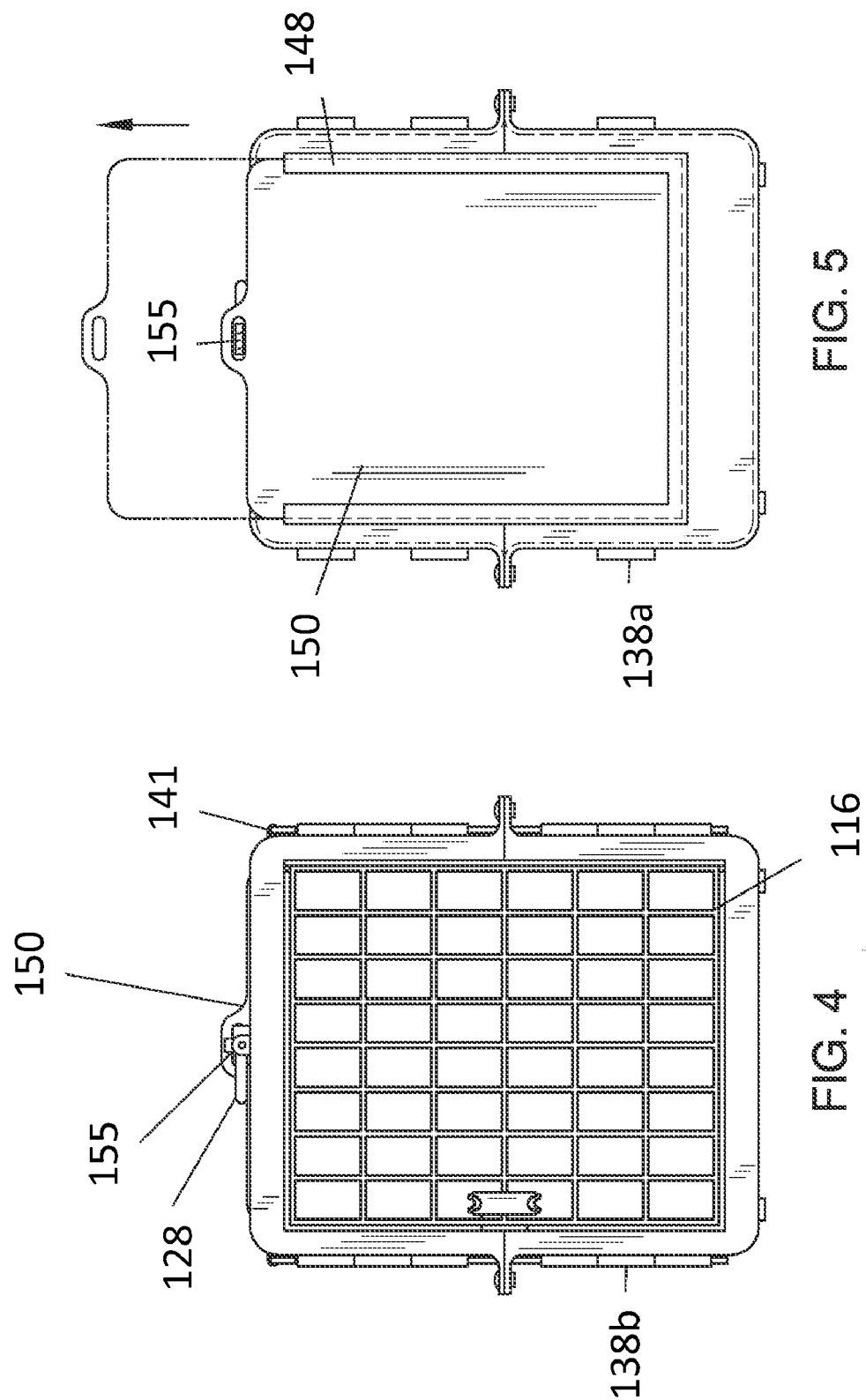

PET CRATE DEVICE WITH SEPARATE CONTAINER FOR BATHROOM

FIELD OF THE INVENTION

The present invention is directed to a pet crate or kennel, more particularly to a novel pet crate device with an additional compartment that provides the pet a space to use the bathroom.

BACKGROUND OF THE INVENTION

Many pet owners, for a variety of reasons, crate their pets for long periods of time. The confined pets must learn to control their bladder and bowel movements so as not to create a mess in their crate. This can be extremely uncomfortable and in some cases impossible for the pet. The present invention features a novel pet crate device comprising a separate compartment providing a place for a pet to use the bathroom. The pet crate device of the present invention separates the animal from its waste and provides a comfortable place for the pet to be crated for an extended period of time.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a pet crate device for providing a pet a place to rest and a place to use the bathroom. In some embodiments, the device comprises a first container with an inner cavity functioning as a place for a pet to rest, a first access door is disposed in a front of the first container, the first access door can move between at least an open position and closed position respectively allowing and preventing access to the inner cavity, a first back opening is disposed in a back of the first container; a second container with an inner cavity functioning as a bathroom for a pet, a second back opening is disposed in a back of the second container; a first attachment means for securing the back of the first container to the back of the second container; a track disposed on the back of the first container surrounding the first back opening; a divider board, the divider board can slide into and out of the track of the first container between at least an open position and closed position respectively allowing and preventing access to the inner cavity of the first compartment via the first back opening, wherein a tab extends upwardly from a top edge of the divider board, the tab functions as a handle to allow a user an easy means of inserting and removing the divider from the track; and a divider board lock disposed on the first container at an intersection of the back and a top, the divider board lock engages the tab of the divider board and functions to secure the divider board in the closed position.

In some embodiments, the first attachment means is a hinge mechanism. In some embodiments, a first set of hinge loops is disposed at an intersection of a first side and the back of the first container, a second set of hinge loops is disposed at an intersection of a second side and the back of the second container, a third set of hinge loops is disposed at an intersection of a second side and the back of the first container, and a fourth set of hinge loops is disposed at an intersection of a first side and the back of the second container, the first set of hinge loops and second set of hinge loops align and the third set of hinge loops and fourth set of hinge loops align when the back of the first container is pressed against the back of the second container. In some embodiments, the pet crate device further comprises a first attachment rod adapted to slide through the first set of hinge loops and second set hinge loops, and a second attachment adapted to slide through the third set of hinge loops and fourth set of hinge loops, the attachment rods function to help prevent the containers from separating. In some embodiments, the attachment rods are connected to the first container or the second container. In some embodiments, the attachment rods are connected to the first container or the second container via string or cord.

In some embodiments, the pet crate device further comprises a gripping hole disposed in the tab of the divider board. In some embodiments, the divider board lock engages the gripping hole of the tab.

BRIEF DESCRIPTION OF THE DRAWINGS

FIG. 4 is a front view of the first container of the pet crate device of FIG. 1.

FIG. 5 is a back view of the first container of the pet crate device of FIG. 1.

DESCRIPTION OF PREFERRED EMBODIMENTS

Figure 1:
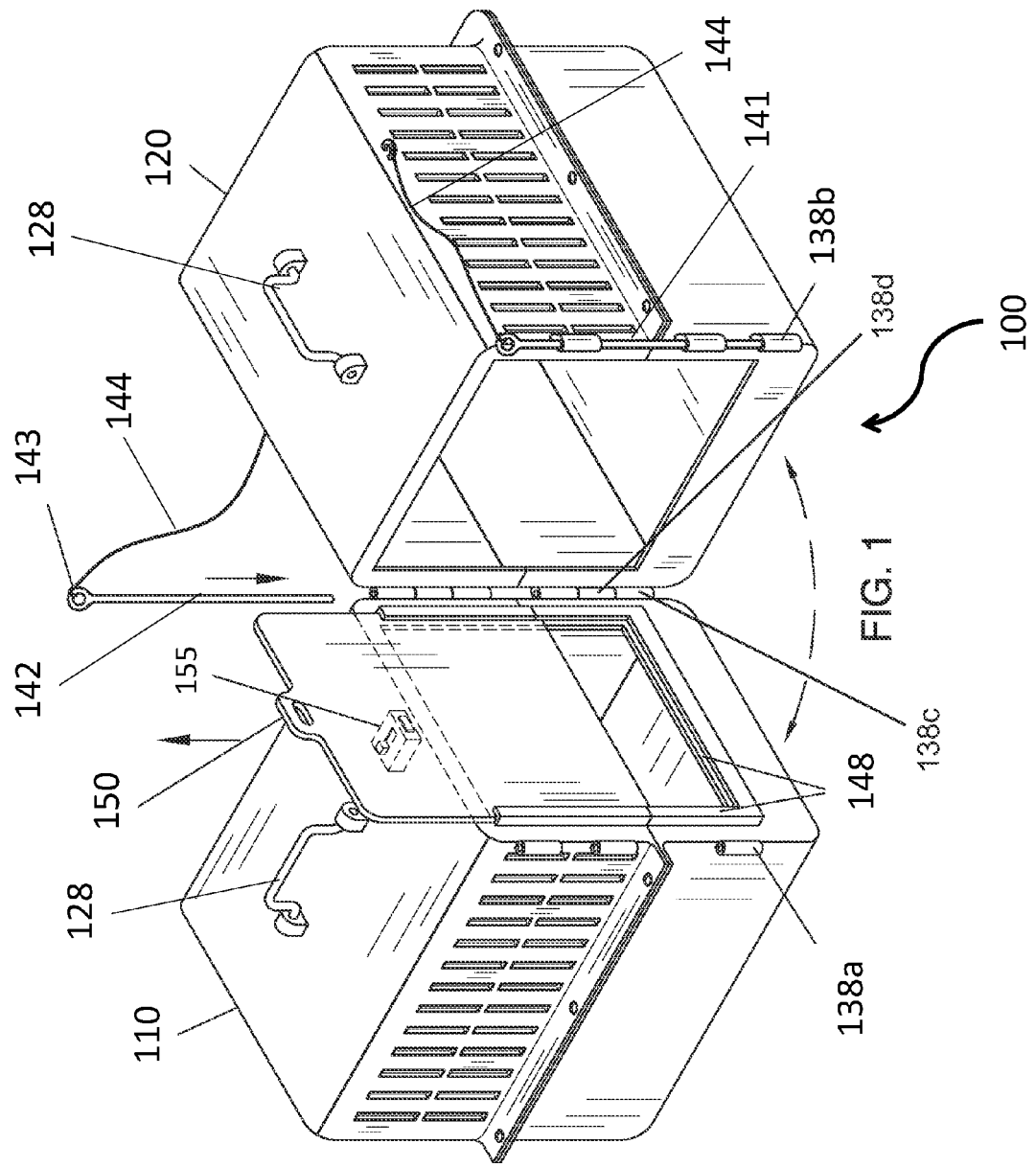
FIG. 1 is a perspective view of the pet crate device of the present invention, wherein the first container and second container are partially connected.

Referring now to FIGS. 1-7, the present invention features a novel pet crate device 100 comprising a separate compartment providing a place for a pet to use the bathroom. The system 100 of the present invention comprises a first container 110 and a second container 120 (e.g., a front container and a rear container). The first container 110 functions to provide a comfortable place for the pet to rest, and the second container 110 functions to provide a place for the pet to use the bathroom. For example, a bathroom pad and/or a litter box 108 may be placed in the second container 120 (see FIG. 6). The containers 110, 120 resemble standard pet crate containers, which are well known to one of ordinary skill in the art. For example, the containers 110, 120 each have a bottom panel, two side panels (e.g., a first side, a second side), a top panel, a back, and a front. Ventilation holes 118 are disposed throughout the containers 110, 120. One or more handles 128 are disposed on the top panels of each container 110, 120.

A first access door 116 is disposed in the front of the first container 110 for providing access to the inner cavity of the first container 110 (e.g., allowing a pet to be placed in or removed from the containers 110, 120). Optionally, in some embodiments, a second access door 126 is disposed in the front of the second container 110 (e.g., see alternative embodiment in FIG. 7). The access door 116 may be similar to standard access doors in pet crates, which are well known to one of ordinary skill in the art. For example, as shown in FIG. 4, the first, access door 116 may be a metal gate-like door. The present invention is not limited to the aforementioned examples. The access door 116 can move between multiple positions including but not limited to an open position and a closed position respectively allowing and preventing access to the inner cavity of the first container 110.

Figure 2:
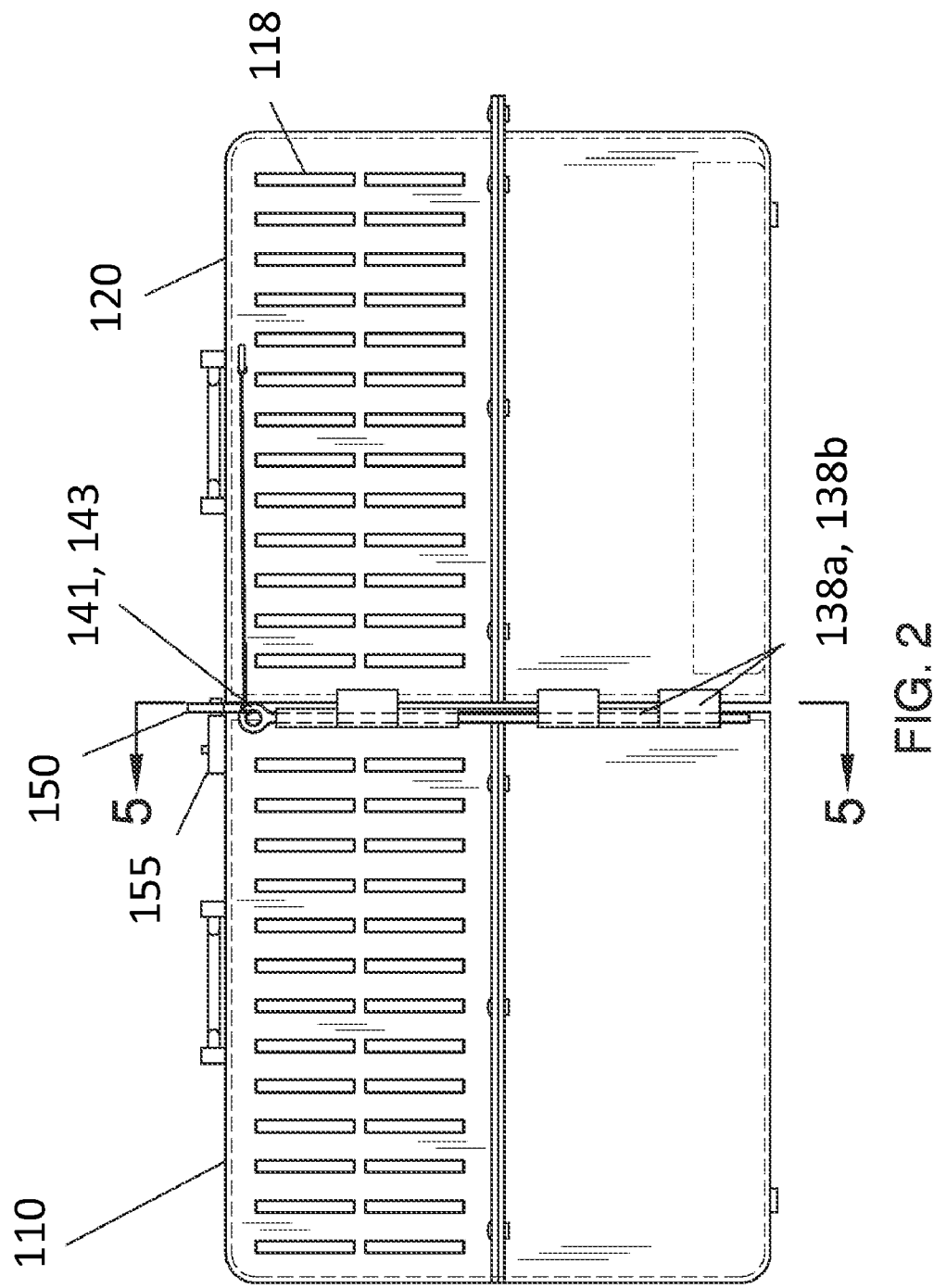
FIG. 2 is a side view of the pet crate device of FIG. 1, wherein the containers are connected.
Figure 3:
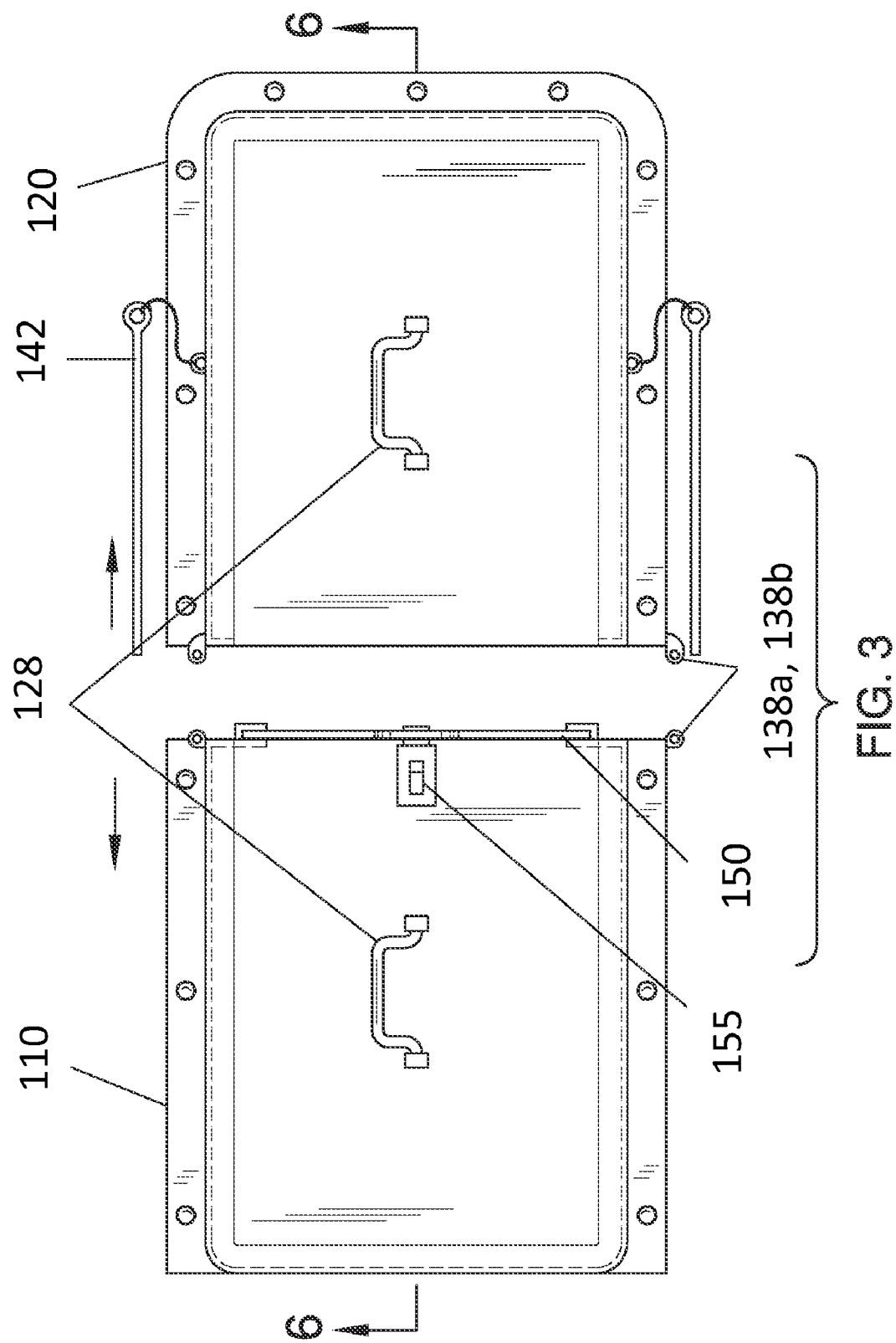
FIG. 3 is a top view of the pet crate device of FIG. 1, wherein the containers are separated.
Figure 6:
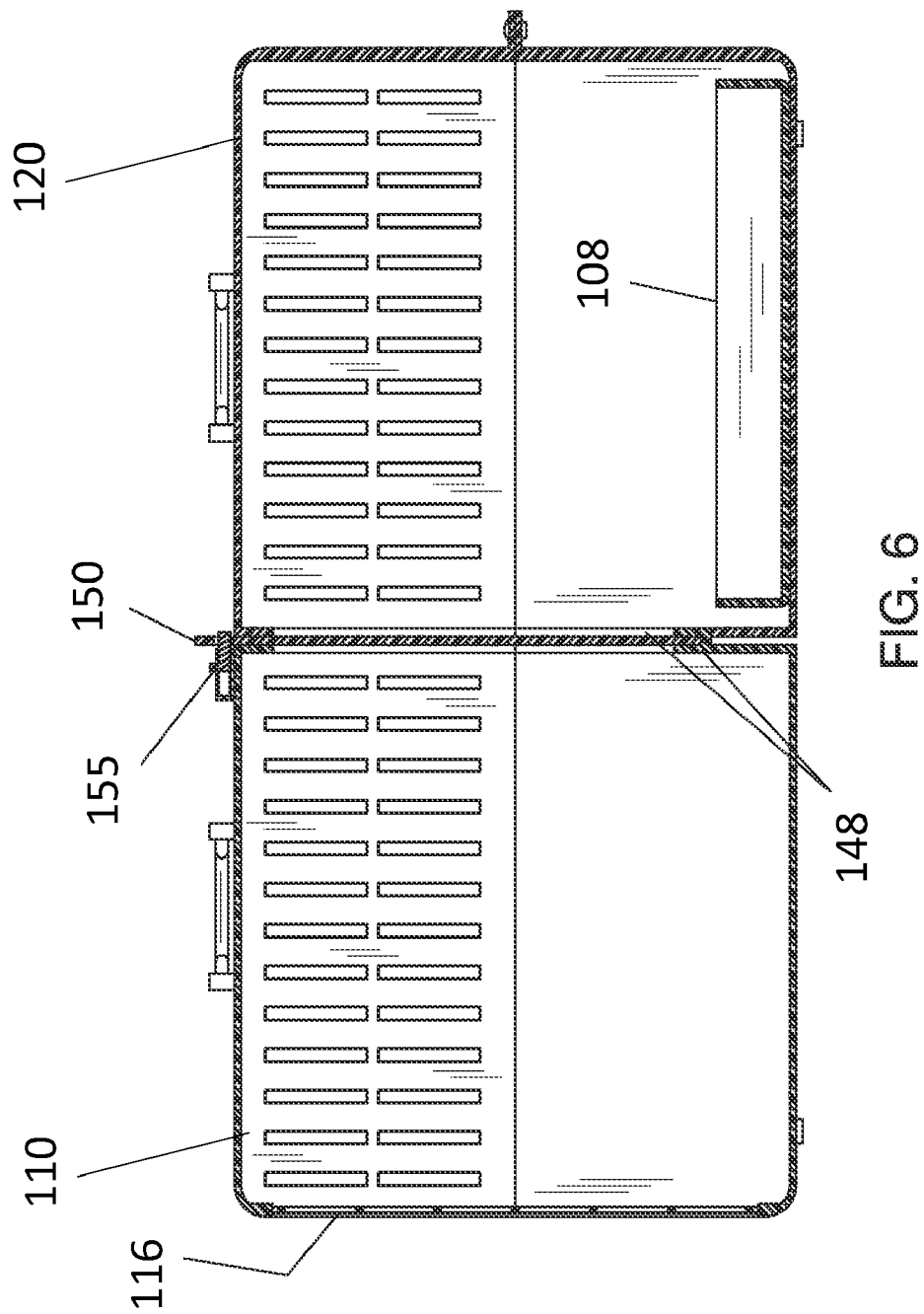
FIG. 6 is a side cross sectional view of the pet crate device of FIG. 3.
Figure 7:
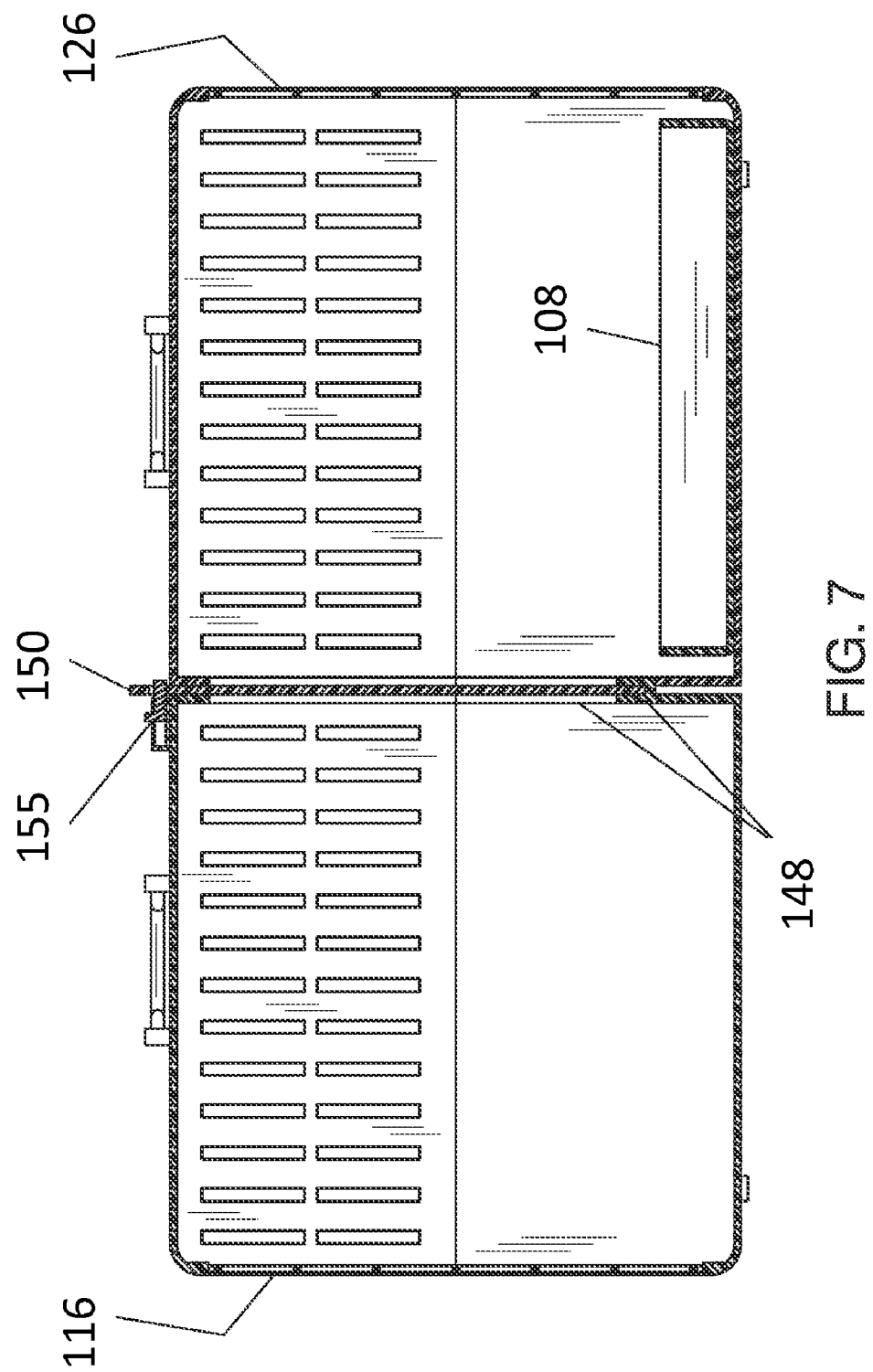
FIG. 7 is a side cross sectional view of an alternative embodiment of the pet crate device of the present invention wherein a second access door 126 is disposed in the front of the second container.

A first back opening is disposed in the back of the first container 110, and a second back opening is disposed in the back of the second container 120. The containers 110, 120 are positioned such that the first back opening of the first container 110 faces the second back opening of the second container 120. The containers 110, 120 are pivotally and/or removably attached via a first attachment means. In some embodiments, the attachment means is a hinge mechanism, however the attachment means is not limited to a hinge mechanism. For example, as shown in FIG. 1, a first set of hinge loops 138a is disposed at the intersection of the first side and back of the first container 110 and a second set of hinge loops 138b is disposed at the intersection of the second side and back of the second container 120. The first set of hinge loops 138a and second set of hinge loops 138b align when the two containers are connected (back to back), as shown in FIG. 2. A third set of hinge loops 138c is disposed at the intersection of the second side and back of the first container 110 and a fourth set of hinge loops 138d is disposed at the intersection of the first side and back of the second container 120. The third set of hinge loops 138c and fourth set of hinge loops 138d align when the two containers are connected (back to back), as shown in FIG. 2.

The hinge loops 138 are adapted to accept attachment rods. For example, a first attachment rod 141 slides through the first set of hinge loops 138a and second set hinge loops 138b, and a second attachment rod 142 slides through the third set of hinge loops 138c and fourth set of hinge loops 138d. The attachment rods 141, 142 keep the sets of hinge loops 138 from disengaging and the containers 110, 120 from separating. The attachment rods 141, 142 may be connected to a container 110, 120, for example to help prevent loss of the attachment rods 141, 142. In some embodiments, a rod loop 143 is disposed on the top end of the attachment rods 141, 142. A string or cord 144 may connect the rod loops 143 to a container 110, 120 (see FIG. 1).

A track 148 is disposed on the back of the first container 110 surrounding the first back opening (e.g., the side edges of the first back opening, the side edges and bottom edge of the back opening, etc.). The track 148 is adapted to receive a divider board 150, for example the divider board 150 can be slid into the track 148 of the first container 110. The divider board 150 functions to cover the first back opening, for example if only the first container 110 is used to house a pet. The divider board 150 moves between multiple positions including but not limited to an open position and closed position respectively allowing and preventing access to the inner cavity of the first compartment 110 via the first back opening. In some embodiments, a tab extends upwardly from the top edge of the divider board 150 functioning as a handle to allow a user to easily insert and remove the divider board 150 from the track 148. In some embodiments, a gripping hole is disposed in the tab of the divider board 150 to provide a user an easy means of gripping the tab.

Disposed on the top of the first container 110 at the intersection of the back and top is a divider board lock 155. The divider board lock 155 functions to secure the divider board 150 in the closed position. In some embodiments, the divider board lock 155 engages the tab, for example the gripping hole of the tab, of the divider board 150.

In some embodiments, the animal is placed in the first container 110 via the access door 116 with the divider board 150 in place. Once the second container 120 is attached to the first container 110, the divider board 150 can be removed, allowing the pet access to the second container 120 for using the bathroom.

The device 100 of the present invention may be constructed in a variety of sizes to accommodate pets of all sizes, for example small dogs and cats, medium size dogs, and large dogs.

The disclosures of the following U.S. Patents are incorporated in their entirety by reference herein: U.S. Pat. No. 6,971,333; U.S. Pat. No. 5,960,744; U.S. Pat. No. 4,016,833; U.S. Pat. No. 4,763,606; U.S. Pat. No. 5,476,066; U.S. Pat. No. 5,551,372; U.S. Design Pat. No. D314,251.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A pet crate device comprising:
    (a) a first container with an inner cavity functioning as a place for a pet to rest, a first access door is disposed in a front of the first container, the first access door can move between at least an open position and closed position respectively allowing and preventing access to the inner cavity, a first back opening is disposed in a back of the first container;
    (b) a second container with a inner cavity functioning as a bathroom for a pet, a second back opening is disposed in a back of the second container;
    (c) a first attachment means for securing the back of the first container to the back of the second container;
    (d) a track disposed on the back of the first container surrounding the first back opening;
    (e) a divider hoard, the divider board can slide into and out of the track of the first container between at least an open position and closed position respectively allowing and preventing access to the inner cavity of the first compartment via the first back opening, wherein a tab extends upwardly from a top edge of the divider board, the tab functions as a handle to allow a user an easy means of inserting and removing the divider from the track; and
    (f) a divider board lock disposed on the first container at an intersection of the back and a top, the divider board lock engages the tab of the divider board and functions to secure the divider board in the closed position;

wherein the first attachment means is a hinge mechanism having a first set of hinge loops and a mated second set of hinge loops connected by an attachment rod, wherein the first set of hinge loops is disposed at an intersection of a first side and the back of the first container, the second set of hinge loops is disposed at an intersection of a second side and the back of the second container, a third set of hinge loops is disposed at an intersection of a second side and the back of the first container, and a fourth set of hinge loops is disposed at an intersection of a first side and the back of the second container, the first set of hinge loops and second set of hinge loops align and the third set of hinge loops and fourth set of hinge loops align when the back of the first container is pressed against the back of the second container, a first attachment rod adapted to slide through the first set of hinge loops and second set hinge loops, and a second attachment rod adapted to slide through the third set of hinge loops and fourth set of hinge loops, wherein the first attachment rods and the second attachment rod function to help prevent the containers from separating.

2. The pet crate device of claim 1, wherein the attachment rods are connected to the first container or the second container.

3. The pet crate device of claim 2, wherein the attachment rods are connected to the first container or the second container via string or cord.

* * * * *